US012276944B2

(12) United States Patent
Imboden et al.

(10) Patent No.: US 12,276,944 B2
(45) Date of Patent: Apr. 15, 2025

(54) HOROLOGICAL MOVEMENT EQUIPPED WITH AN OSCILLATOR COMPRISING A PIEZOELECTRIC BALANCE-SPRING

(71) Applicant: The Swatch Group Research and Development Ltd, Marin (CH)

(72) Inventors: Matthias Imboden, St-Blaise (CH); Alexandre Didier, Erlach (CH); Alexandre Haemmerli, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 407 days.

(21) Appl. No.: 17/804,667

(22) Filed: May 31, 2022

(65) Prior Publication Data

US 2023/0044830 A1 Feb. 9, 2023

(30) Foreign Application Priority Data

Aug. 4, 2021 (EP) .................................... 21189581

(51) Int. Cl.
*G04F 5/06* (2006.01)
*G04C 3/04* (2006.01)

(52) U.S. Cl.
CPC ............. *G04F 5/063* (2013.01); *G04C 3/047* (2013.01)

(58) Field of Classification Search
CPC ......... G04B 17/20; G04C 3/047; G04F 5/063; G04F 5/06
See application file for complete search history.

(56) References Cited

U.S. PATENT DOCUMENTS 7,922,385 B2 * 4/2011 Nagao .................... H02N 2/123 368/125
8,721,169 B2 5/2014 Schafroth
(Continued)

FOREIGN PATENT DOCUMENTS

EP 3 540 528 A1 9/2019
EP 3 629 103 A1 4/2020
EP 4 099 100 A1 12/2022

OTHER PUBLICATIONS

European Search Report issued Jan. 11, 2022 in European Application 21189581.8 filed on Aug. 4, 2021 (with English Translation of Categories of cited documents), 3 pages.

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

An horological movement includes an analogue time display, a geartrain, a barrel and an electromechanical oscillator, which is formed of a resonator, including a balance and a piezoelectric balance-spring, and a mechanical escapement, and further includes an electronic control circuit connected to an electrical energy source and arranged to be able to control the application of an electrical voltage on at least one electrode of the piezoelectric balance-spring so as to generate driving electrical pulses for the oscillator. The horological movement is configured such that the barrel is capable, in a first main state, of maintaining alone a functional oscillation of the oscillator with a first amplitude, while in a second main state, the electronic control circuit powers the piezoelectric balance-spring to maintain, partially or fully, the oscillation of the resonator with a second amplitude greater than the first amplitude for any spatial orientation, the second amplitude being preferably constant.

6 Claims, 6 Drawing Sheets

(56) References Cited

U.S. PATENT DOCUMENTS

| | | | | |
|---|---|---|---|---|
| 2008/0212415 | A1* | 9/2008 | Nagao | G04C 3/12<br>310/329 |
| 2012/0201049 | A1* | 8/2012 | Sherman | H02J 50/15<br>362/602 |
| 2013/0051191 | A1* | 2/2013 | Schafroth | G04C 3/047<br>368/175 |
| 2019/0079460 | A1* | 3/2019 | Haemmerli | G04B 17/066 |
| 2019/0286063 | A1 | 9/2019 | Nagy et al. | |
| 2020/0103826 | A1 | 4/2020 | Tombez et al. | |

* cited by examiner

Electronic control circuit
20
21A
21B
16
12
14

76
16
60
62
74B
69
64
64
74A
68
78B
71
70
78A
74B
74A
69
68
66
64

HOROLOGICAL MOVEMENT EQUIPPED WITH AN OSCILLATOR COMPRISING A PIEZOELECTRIC BALANCE-SPRING

CROSS-REFERENCE TO RELATED APPLICATION

This application claims priority to European Patent Application No. 21189581.8 filed on Aug. 4, 2021, the entire disclosure of which is hereby incorporated herein by reference.

TECHNICAL FIELD OF THE INVENTION

The present invention relates to a horological movement comprising a barrel and an analogue time display, which is driven by the barrel via a geartrain, as well as a sprung-balance for controlling the working of the horological movement. The balance-spring is of the piezoelectric type with electrodes arranged on the two lateral surfaces. The invention also relates to a watch incorporating such a horological movement and an electrical energy source.

TECHNOLOGICAL BACKGROUND

From the U.S. Pat. No. 9,721,169, a horological movement is known comprising a sprung-balance type oscillator with a piezoelectric balance-spring equipped with electrodes connected to a variable capacitance to be able to vary the rigidity of the balance-spring and thus adjust the natural frequency thereof to increase the precision of the time display.

Patent applications EP 3 540 528 and EP 3 629 103 respectively describe a method for regulating the medium frequency of a spring-balance and a method for synchronising the frequency of a spring-balance using a piezoelectric balance-spring connected to an electronic control unit equipped with a quartz oscillator.

SUMMARY OF THE INVENTION

The aim of the present invention is that of modifying a mechanical type horological movement by incorporating an electronic system making it possible to increase the working precision thereof, without for all that doing away with a spring-balance for timing the working of the horological movement, particularly the drive of the analogue display device thereof. Furthermore, the present invention proposes to modify the horological movement in such a way that it remains functional even when the electronic system is idle, particularly due to a lack of available electrical energy.

The invention relates to a horological movement comprising an analogue time display, a geartrain, a barrel kinematically linked with the analogue display via the geartrain, and an oscillator formed of a resonator, comprising a balance and a piezoelectric balance-spring, and a mechanical escapement coupling the balance with the geartrain, the piezoelectric balance-spring being formed at partially from a piezoelectric material and comprising at least two electrodes of which at least one electrode is connected to an electronic control circuit, the piezoelectric material and said at least one electrode being arranged in such a way as to enable the application, managed by the electronic control circuit, of electrical stress on the piezoelectric balance-spring. Then, the horological movement is configured such that the barrel is capable of driving the analogue display and maintaining alone a functional oscillation of the oscillator with a first amplitude which is particularly dependent on the spatial orientation of the horological movement. Furthermore, the electronic control circuit is arranged to be able to be connected to an electrical energy source and to be able to control the application of an electrical voltage to said at least one electrode so as to generate driving electrical pulses for the oscillator which supply it with sufficient energy to enable a functional oscillation of this oscillator, for each spatial orientation of the horological movement, with a second amplitude which is greater than a maximum nominal value of the first amplitude for this spatial orientation.

According to a preferred embodiment, the electronic control circuit is arranged to control said application of an electrical voltage in such a way as to keep the second amplitude substantially constant for any spatial orientation of the horological movement and any winding level of the barrel. To this end, in a specific alternative embodiment, the electronic control circuit comprises a circuit for detecting the amplitude of a voltage induced in the piezoelectric spring-balance and a feedback loop to keep this amplitude at a given setpoint value, thus making it possible to regulate the amplitude of the oscillation of the resonator.

In an advantageous alternative embodiment, said maximum nominal value is less than or equal to 300° for any spatial orientation of the horological movement and said second amplitude is greater than 300° for any spatial orientation of the horological movement and any winding level of the barrel.

The invention also relates to a watch incorporating an energy source which is formed by an electricity generator arranged to be able to collect an external energy and convert it into electricity, so as to enable a power supply of the electronic control circuit and the piezoelectric balance-spring.

Thanks to the features of the invention, the precision of the watch incorporating the movement according to the invention can be increased, in particular thanks to a large amplitude for the oscillation of the balance which can be maintained by the driving electrical pulses supplied to the electromechanical oscillator via the piezoelectric balance-spring. Then, the preferred embodiment makes it possible firstly to compensate a reduction in the force torque supplied by the barrel, so as to keep the oscillation maintenance power substantially constant for each spatial orientation of the horological movement, respectively of the watch incorporating it. Thus, the frequency variation of the oscillator generally involved in a conventional mechanical movement due to the variation of the force torque supplied by the barrel over time is eliminated in this preferred embodiment. Furthermore, this preferred embodiment makes it possible to eliminate a difference in amplitude for different spatial positions of the horological movement, respectively of the watch incorporating it. Finally, the preferred embodiment makes it possible to prevent variations of the working of the horological movement liable to arise for other reasons in conventional mechanical movements, i.e. ageing of the oils, hard spots in the geartrain or a momentarily increased torque request, such as when changing from one date to the next, etc. Thus, the present invention makes it possible to effectively solve the various problems liable to arise in mechanical horological movements and resulting in a loss of isochronism, which results in a time drift in the current time display.

BRIEF DESCRIPTION OF THE FIGURES

The invention will be described hereinafter in more detail using the appended drawings, given as non-restrictive examples, wherein.

DETAILED DESCRIPTION OF THE INVENTION

With reference to the Figures, various embodiments of a horological movement according to the invention will be described, as well as the general arrangement of a watch according to the invention.

Figure 1:
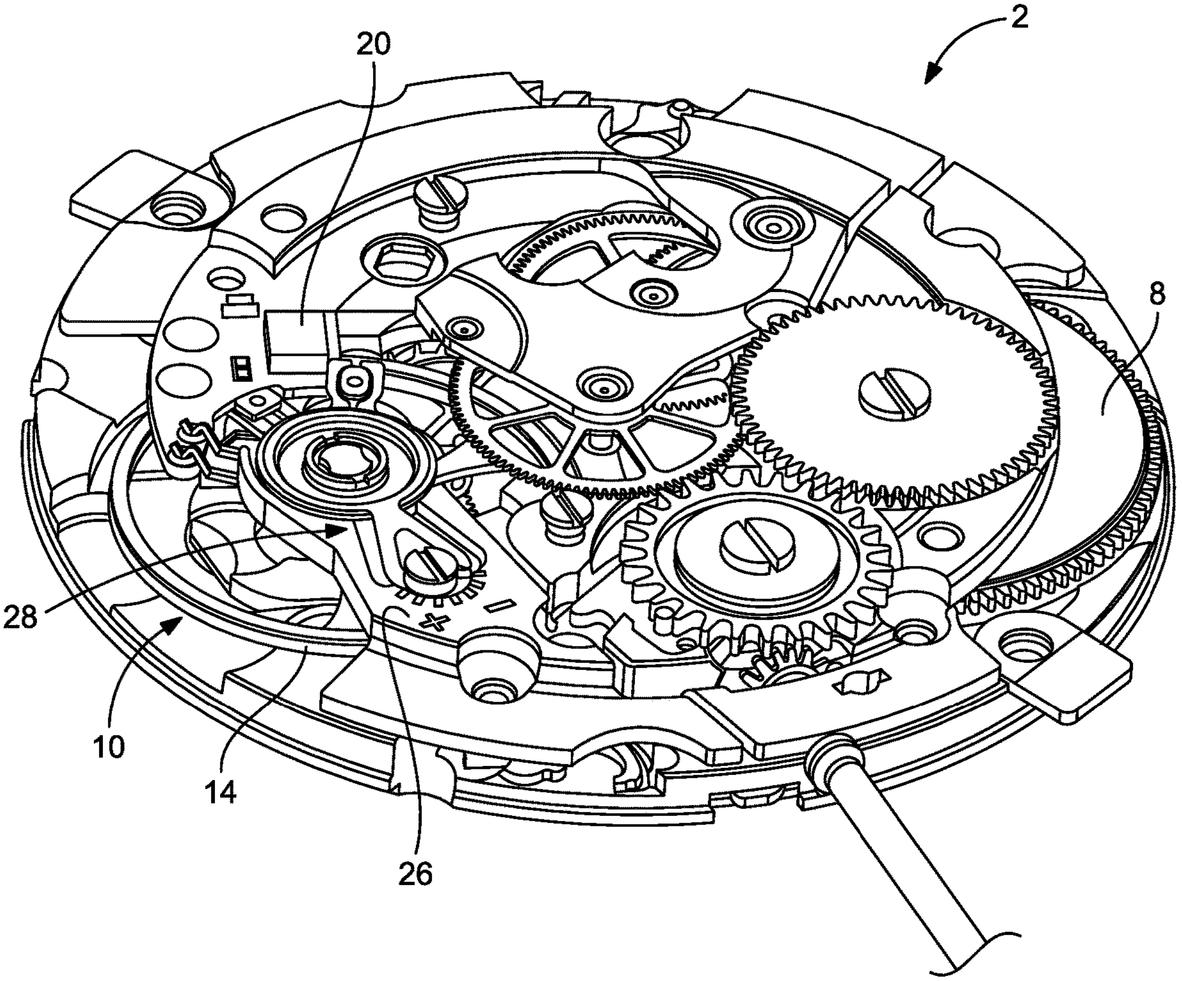
FIG. 1 is a perspective view of an embodiment of a horological movement according to the invention (without the oscillating mass provided to wind the barrel)
Figure 2:
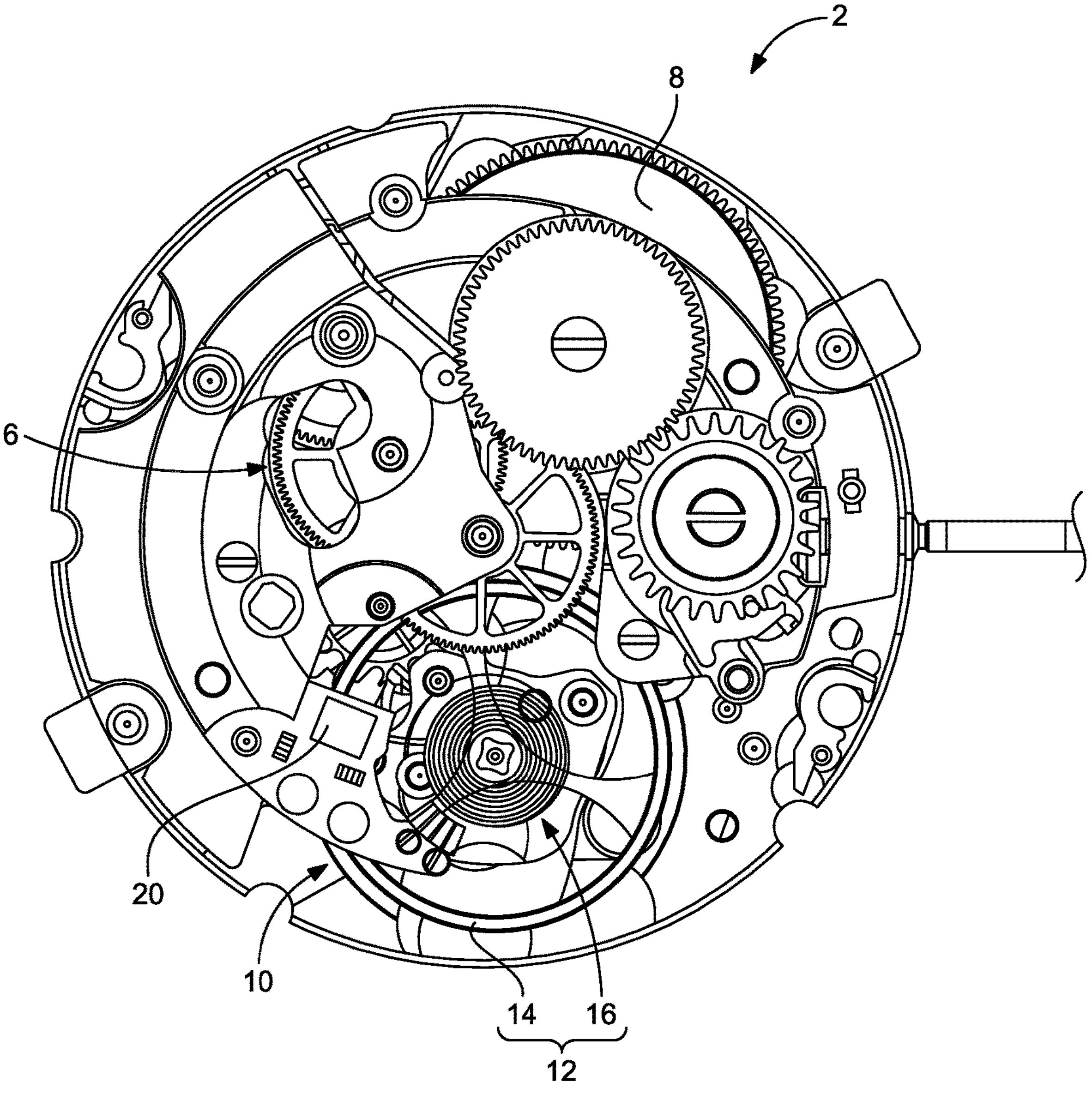
FIG. 2 is a bottom view of the horological movement in FIG. 1, from which the balance bridge and the index-assembly have been removed.

The horological movement 2 comprises an analogue time display 4, a geartrain 6, a barrel 8 driving the analogue display via the geartrain, and an electromechanical oscillator 10 formed of a resonator 12, comprising a balance 14 and a piezoelectric balance-spring 16, and a mechanical escapement 18 coupling the balance with the geartrain. The horological movement is equipped with an oscillating mass 24 (not shown in FIGS. 1 and 2, but in FIGS. 5 and 6) used to wind the barrel. The balance is pivoted in a balance bridge 26, this bridge carrying an index-assembly 28 used for setting the oscillation frequency of the resonator 12, as is standard with mechanical horological movements.

Figure 3:
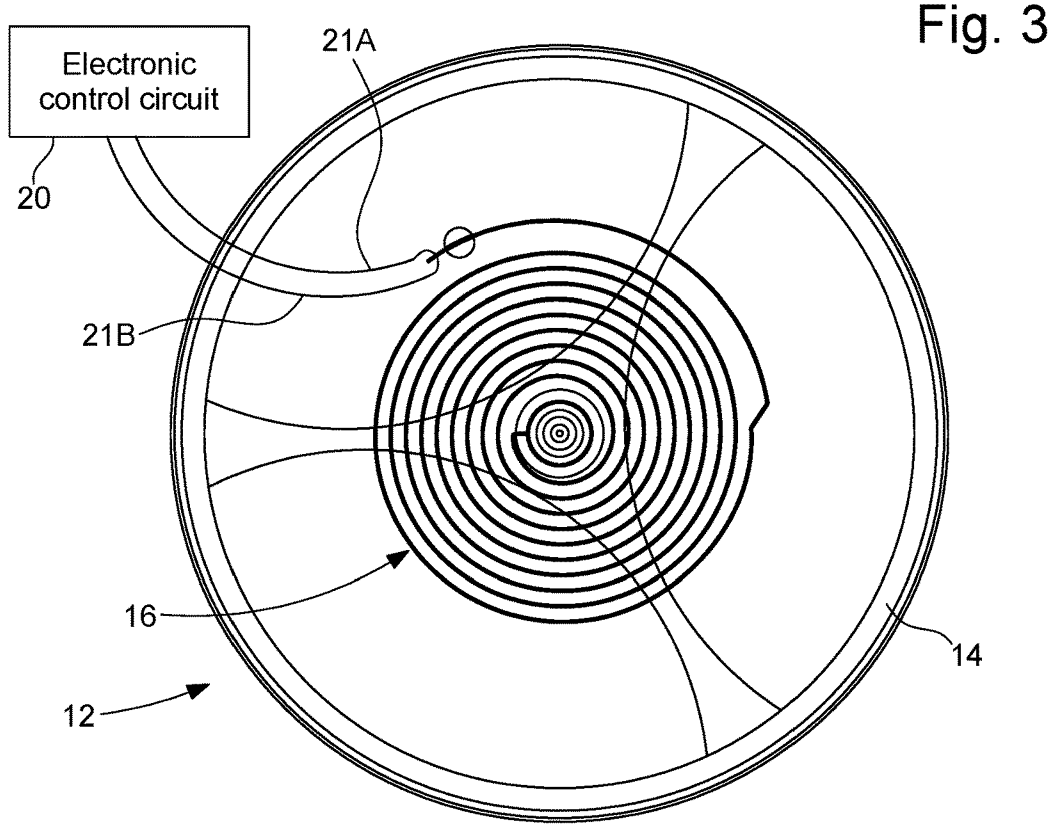
FIG. 3 is an enlarged and schematic view of the resonator forming the electromechanical oscillator in the embodiment of the horological movement in FIG. 1.
Figure 4:
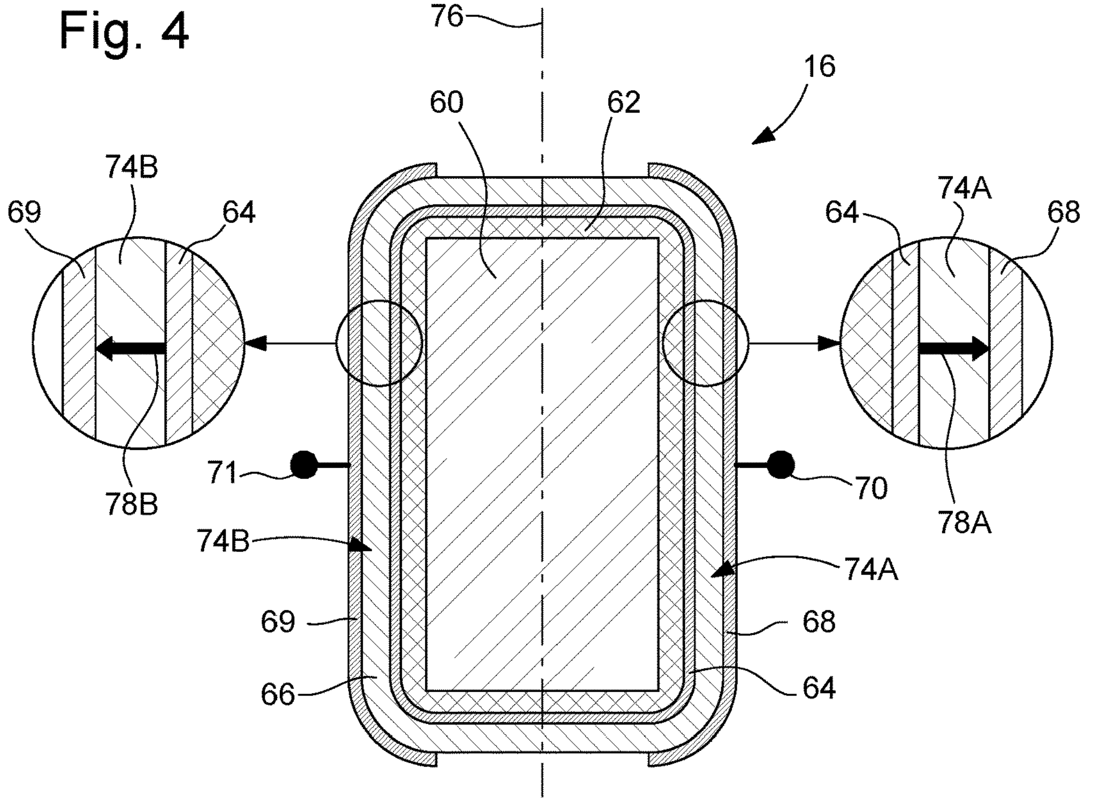
FIG. 4 is a transverse section of the piezoelectric balance-spring forming the resonator in FIG. 3.

As a general rule, the piezoelectric balance-spring is formed at least partially from a piezoelectric material and comprises at least two electrodes of which at least one is connected to an electronic control circuit 20. In FIG. 3, the resonator 12 and the electronic control circuit 20 to which two outer electrodes 68 and 69 of the piezoelectric spiral 16 are connected by electrical links 21A and 21B are represented. A transverse section of the piezoelectric balance-spring 16 is represented in FIG. 4 in a non-limiting manner. This balance-spring comprises a central body 60 made of silicon, a coat of silicon oxide 62 deposited on the surface of the central body so as to compensate the balance-spring thermally, a first conductive coat 64 deposited on the silicon oxide coat, and a piezoelectric material deposited in the form of a piezoelectric coat 66 on the first conductive coat 64. In a specific alternative embodiment, the piezoelectric coat consists of an aluminium nitride crystal formed by the growth of this crystal from the first conductive coat and perpendicularly thereto. Two outer electrodes 68 and 69, formed by a second partial conductive coat on the piezoelectric coat, are arranged respectively on the two lateral sides of the balance-spring and are connected to two respective terminals 70 and 71 of the electronic control circuit 20. Thus, the piezoelectric layer 66 comprises a first part 74A and a second part 74B which extend respectively on the two lateral sides of the central body 60 and which have, due to the growth thereof from the first conductive coat 64, respective crystallographic structures which are symmetrical relative to a median plane 76 parallel with these two lateral sides. Thus, in the two lateral parts 74A and 74B, the piezoelectric coat 66 has two respective piezoelectric axes 78A and 78B perpendicular to this piezoelectric coat and of opposite directions.

For the same overall mechanical stress exerted on the piezoelectric balance-spring 16 (balance-spring contracted or extended relative to the idle position thereof), an inversion of the sign of the induced voltage occurs between the inner electrode 64, formed by the first conductive coat, and each of the two outer lateral electrodes 68 and 69 given that, when the balance-spring contracts or extends from the idle position thereof, there is an inversion of the mechanical stress in the first and second lateral parts 74A and 74B, i.e. one of these two parts is compressed while the other of these parts is elongated/pulled, and vice versa.

As a result of the above considerations, the local induced voltages in the first and second parts 74A, 74B of the piezoelectric coat have, along a geometric axis perpendicular to the two lateral sides, the same polarity, such that a single common inner electrode 64 is sufficient, this common inner electrode extending on the two lateral sides of the central body 60. It is therefore possible to recover a voltage induced between the two outer electrodes 68 and 69, which corresponds to adding two local induced voltages (in absolute values) which are generated respectively in the first and second parts 74A and 74B of the piezoelectric coat 66. As a result of these considerations, a certain voltage can be applied between the two electrodes 68 and 69 to actively constrain the balance-spring during an excitation of the resonator 12 and particularly supply it with the driving pulses. It will be noted that the inner electrode, formed of the first conductive coat 64, does not need its own electrical link with the electronic control circuit 20 or with the mass of the horological movement, although this is not excluded.

Within the scope of the invention, the piezoelectric material 66 and the two electrodes 68 and 69 are arranged so as to enable the application, controlled by the electronic control circuit 20, of electrical stress on the piezoelectric balance-spring so as to supply the resonator 12 with the driving pulses which contribute at least partially to maintaining a functional oscillation of this resonator, preferably with a substantially constant amplitude. To this end, the electronic control circuit 20 is arranged to be able to be connected to an electrical energy source 30 and to be able to control the application of an electrical voltage between the outer electrodes 68 and 69, so as to generate driving pulses for the resonator 12. As a general rule, according to the invention, the electronic control circuit is arranged to be able to manage the application of an electrical voltage to at least one of the two outer electrodes 68 and 69, so as to generate driving pulses for the electromechanical oscillator 10 via the piezoelectric balance-spring constrained by the electrical voltage applied, so as to supply an electrical energy to this oscillator which is sufficient so that the resonator 12 can have a functional oscillation with an amplitude greater than the maximum nominal value for the amplitude of a functional oscillation of this resonator, for each spatial orientation of the horological movement, in the absence of driving pulses of electrical origin.

In particular, it is provided to supply driving electrical pulses to the electromechanical oscillator 10, i.e. energy pulses, which make it possible either to maintain a functional oscillation of the resonator 12, or to contribute to the maintenance of such a functional oscillation. The frequency of these driving pulses is particularly dependent on the duration thereof and the electrical voltage thereof. In particular, such driving pulses can be designed in such a way that they occur once during each alternation or once per oscillation period of the resonator.

Figure 5:
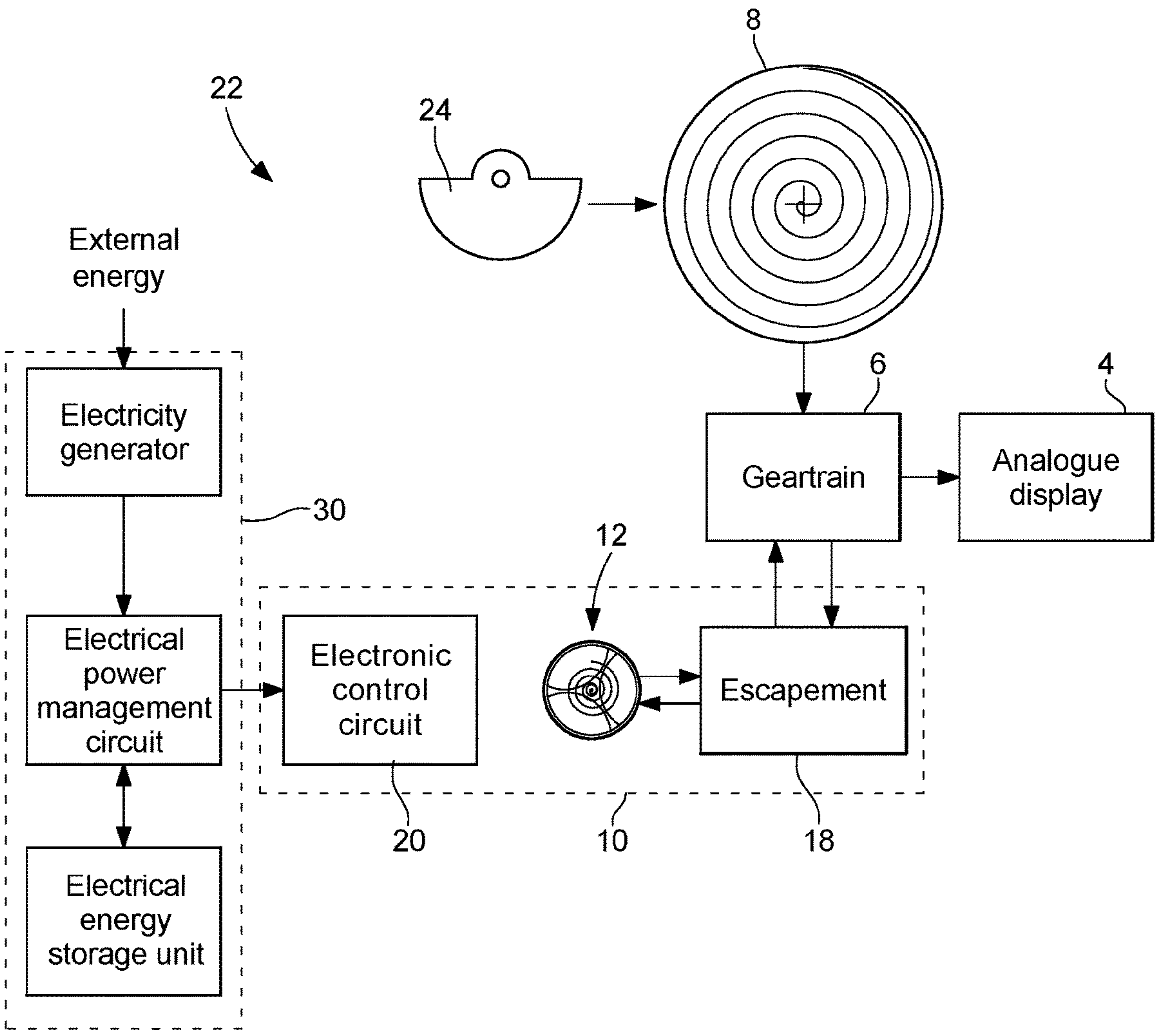
FIG. 5 schematically shows a watch according to the invention incorporating a horological movement according to the invention, this watch being represented here in a first main operating state.
Figure 6:
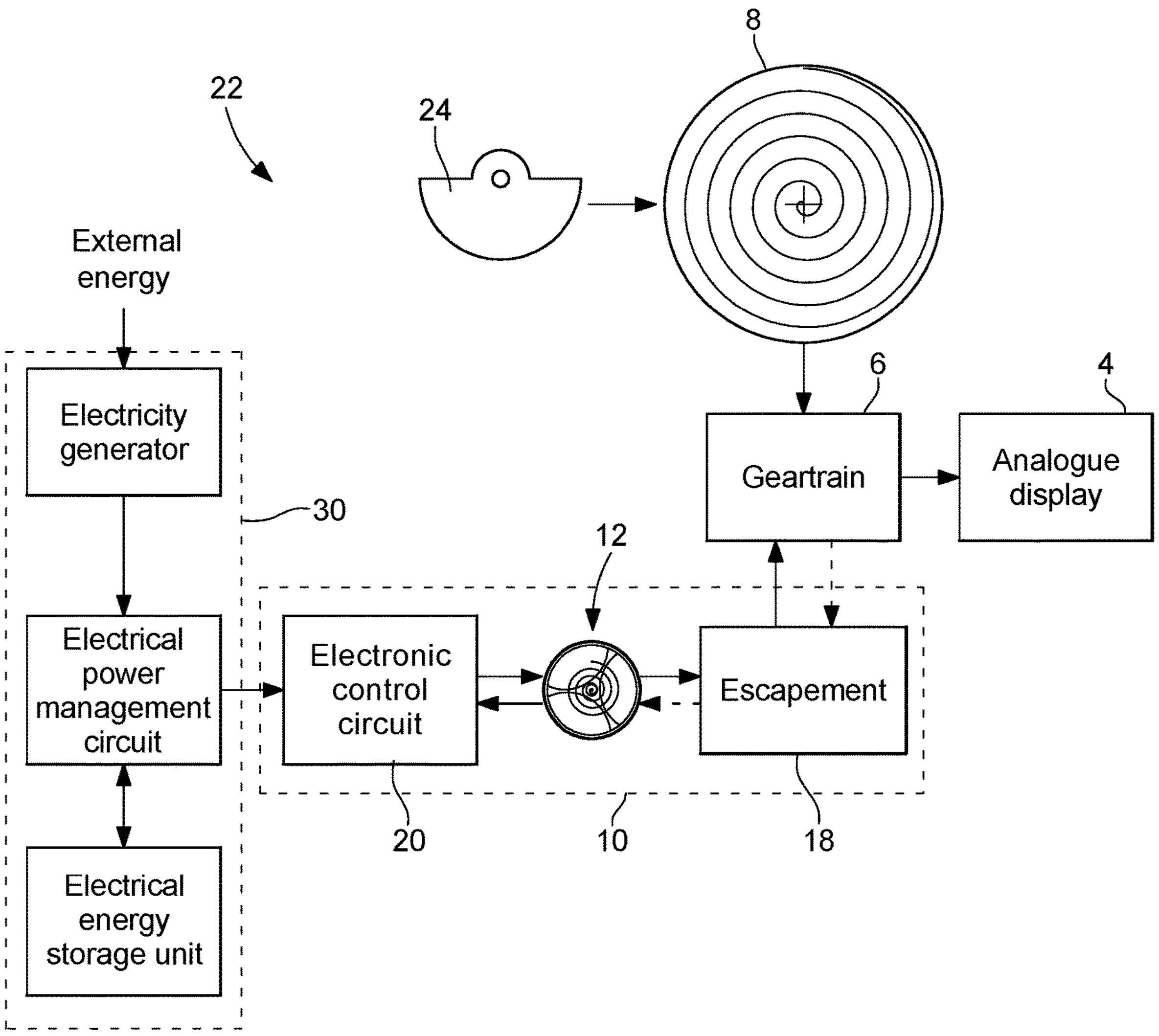
FIG. 6 represents the watch in FIG. 6 while it is in a second main operating state.

FIGS. 5 and 6 schematically represent a watch 22 according to the invention comprising a horological movement according to the invention. The parts of the horological movement already described will not be described again here in detail. The watch 22 comprises an electrical energy source 30 which is formed by an electricity generator arranged to produce electricity so as to enable a power supply of the electronic control circuit 20 and the piezoelectric balance-spring. In the alternative embodiment represented, the electricity generator is connected to a storage unit, particularly a rechargeable battery or a supercapacitor, via a circuit for managing the electrical power supplied to the electronic control circuit 20 and to the electromechanical oscillator 10. In particular, it will be noted that the voltage required to power the piezoelectric balance-spring is located in a voltage range between 10 V and 40 V. Such a voltage is substantially greater than the battery voltages generally incorporated in watches and also substantially greater than the voltages supplied by horological type solar cells. Thus, the electrical power management circuit is arranged to be able to increase the voltage accumulated in the storage unit or supplied directly by the electricity generator. To this end, it comprises a voltage elevator, for example a booster pump.

Various types of electrical generators can be provided, in particular at least one solar cell arranged at the dial of the watch or the bezel of this watch. In another embodiment, a thermopile is provided which receives as external energy to the watch a thermal energy from the user's arm. The thermopile is thus arranged so as to be able to convert a user's body heat into electricity. This alternative embodiment is particularly advantageous because it makes it possible to activate an electrical energy power supply of the electromechanical oscillator, to increase the oscillation amplitude thereof according to the invention and enable an enhancement of the precision thereof as described in more detail hereinafter, when the watch is worn and therefore subject to variations of the spatial orientation thereof. When the watch is not worn and the electrical power supply is not active, this watch can be left in a stable position such that the oscillation amplitude and thus the frequency of the electromechanical oscillator are no longer disturbed by variations of orientation of the watch. On the other hand, the electrical power supply is active and the electrical control circuit is operational when the watch is worn, i.e. when the amplitude and thus the frequency of a conventional mechanical movement vary according to the spatial orientation of the watch. In this scenario, the present invention generally makes it possible to enhance the working of the watch and, in a preferred embodiment which will be described in more detail hereinafter, keep the oscillation amplitude of the electromechanical oscillator constant for any spatial orientation and any winding level of the barrel which is sufficient for driving the analogue display device. Finally, it will be noted that in another embodiment, the watch according to the invention does not comprise an electrical generator which makes it autonomous, but it then comprises a battery in cell form.

In FIG. 5, a first main state provided during the operation of the watch 22, in particular of the horological movement 2 incorporated therein, is represented. In this first main operating state, the electrical energy source 30 does not comprise enough stored electrical energy or does not receive enough electrical energy from the electricity generator to supply the piezoelectric balance-spring correctly, such that the electronic control circuit 20 does not generate driving electrical pulses. In this first state, the horological movement 2 therefore does not behave like a conventional mechanical movement. The escapement 18 is a standard escapement which is not only counting but also arranged to enable a barrel, via a geartrain, to supply mechanical maintenance pulses to the resonator 12 to obtain a functional oscillation thereof. The horological movement is therefore configured such that the barrel is capable of driving the analogue display 4 of the watch 22 and maintaining alone a functional oscillation of the oscillator with a first amplitude which is particularly dependent on the spatial orientation of the horological movement.

In the first main operating state, the oscillation frequency of the resonator will therefore vary according to the spatial orientation of the horological movement and in general also the winding level of the barrel. It is known that when the force torque supplied by the barrel decreases, the amplitude of the oscillation of the resonator also decreases substantially in the final third of the power reserve. A decrease in amplitude generally induces a decrease in the oscillation frequency and the working precision is therefore affected thereby. Furthermore, the amplitude varies according to the orientation of the horological movement (more specifically of the resonator), such that this first state is therefore not ideal but useful within the scope of the present invention which particularly has the aim of keeping the horological movement functional in the absence of a sufficient electrical power supply. This first state is in particular provided for a scenario where the watch in question is not worn and left advantageously in a favourable given position. The frequency variation of the resonator is thus limited since no amplitude variation due to changes of orientation of this resonator occurs.

In FIG. 6, a second main state provided during the operation of the watch 22, in particular of the horological movement 2, is represented. In this second main operating state, the electrical energy source 30 comprises enough stored electrical energy or it receives enough electrical energy from the electricity generator to supply the piezoelectric balance-spring correctly, such that the electronic control circuit 20 then generates driving electrical pulses. Thus, the electronic control circuit manages the application of an electrical voltage to at least one electrode of the two electrodes 68, 69 of the piezoelectric balance-spring by applying an electrical voltage to at least one of the corresponding terminals 70, 71 (see FIGS. 4 and 7), so as to generate driving pulses for the oscillator 10 which supply it with sufficient energy to enable a functional oscillation of the oscillator, for each spatial orientation of the horological movement, with a second amplitude which is greater than a maximum nominal value of the first amplitude, mentioned above and occurring in the first main state, for this spatial orientation.

In a first alternative embodiment, the maximum nominal value of the first amplitude is less than or equal to 300° for any spatial orientation of the horological movement, in particular of the resonator 12 thereof, and the second amplitude is greater than 300° for any spatial orientation of the horological movement and any winding level of the barrel.

In a second alternative embodiment, the maximum nominal value of the first amplitude is between 240° and 300° for any spatial orientation of the horological movement, in particular of the resonator 12, and the second amplitude is provided between 305° and 300° for any spatial orientation of the horological movement and any winding level of the barrel.

By increasing the oscillation amplitude of the resonator 10 by electrical means, particularly when the watch is worn by a user as indicated above, the overall energy thereof and thus the ability thereof to withstand accelerations caused particularly by sudden movements are increased, without increasing the mechanical energy consumption. The precision of the time display is enhanced thereby. In particular, if the second main operating state is guaranteed when the watch in question is worn, the invention makes it possible to provide a gear ratio between the barrel and the escapement wheel which can be greater than that of conventional mechanical movements, and therefore increase the power reserve, while ensuring a functional oscillation of the oscillator 10 at least during stable conditions, particularly in the absence of accelerations such as when the watch is not worn, preferably for any spatial orientation of this watch and therefore of the horological movement but at least for a given orientation.

According to the configuration of the mechanical escapement, the winding level of the barrel and the electrical power supplied to the electromechanical oscillator 10, two alternative operations can occur in the second main state of the watch 22 described hereinabove. In the first alternative, particularly due to the inertia of the geartrain (including the escapement wheel), the maintenance of the resonator 12 and the alternating movement of the pallet assembly of the mechanical escapement are substantially or completely carried out by the electrical power supply of the piezoelectric balance-spring, particularly by driving electrical pulses. In this case, the drive speed of the pallet assembly by the balance of the resonator 12 is too high for the escapement wheel to be able, during each step of this escapement wheel after the unlocking of the pallet assembly, to supply a significant force torque to this pallet assembly. In the second alternative, the maintenance of the resonator and the alternating movement of the pallet assembly are carried out jointly by the barrel 8 and the electrical energy source 30. It can be envisaged that a watch according to the invention only has one or the other these two alternatives in the operation thereof when the second main state is activated. However, in another watch according to the invention, the first alternative and the second alternative operation occur at different times, particularly according to the winding level of the barrel and optionally the spatial orientation of this other watch, in particular of the resonator thereof.

Figure 7:
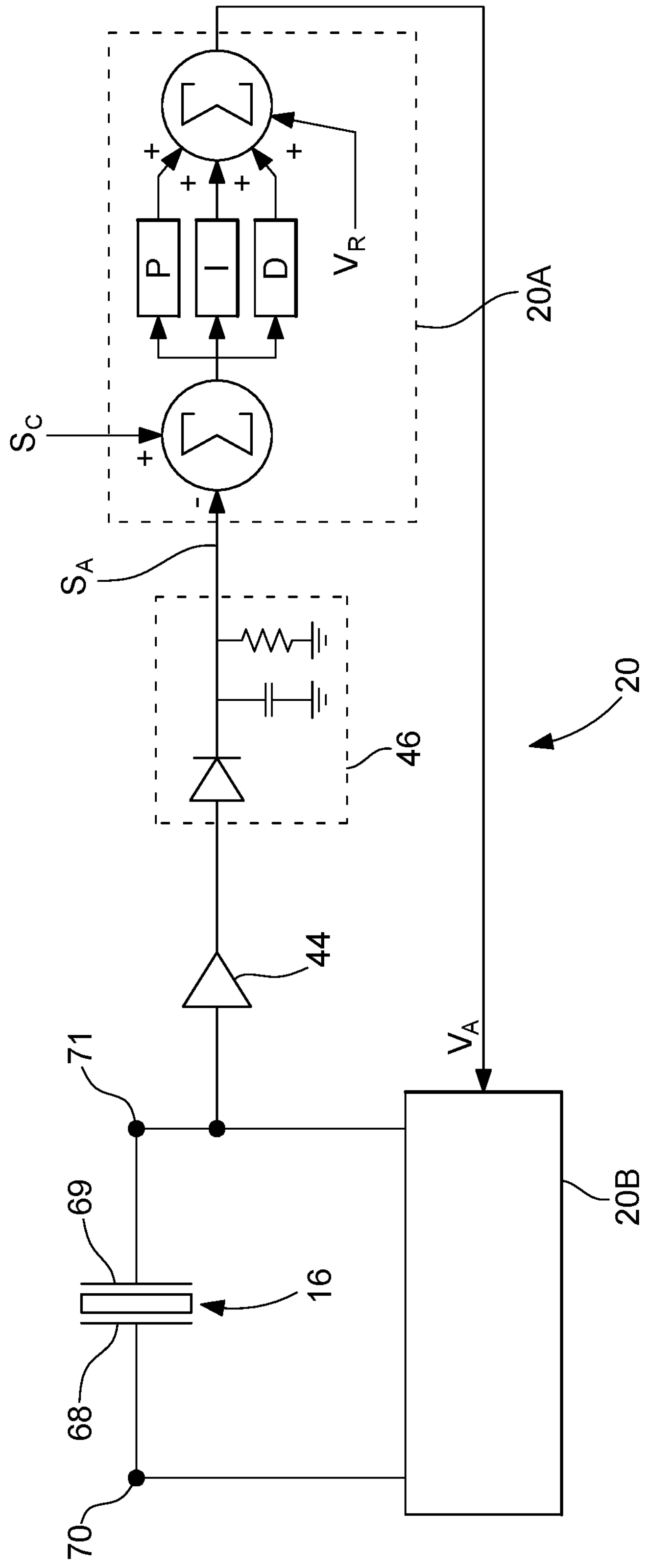
FIG. 7 is a schematic representation of the electronic control circuit of the electromechanical oscillator incorporated in the preferred embodiment of the invention.

With reference to FIG. 7, a preferred embodiment of the invention will be described hereinafter, wherein the electronic control circuit 20 is arranged to be able to control the application of an electrical voltage to the piezoelectric balance-spring so as to keep, in the second main operating state of the horological movement, the amplitude of the oscillation of the resonator 12/oscillator 14 substantially constant particularly for any spatial orientation of the horological movement and any winding level of the barrel.

In this preferred embodiment, the electronic control circuit 20 comprises a peak voltage detector 46, which is arranged to be able to detect substantially the amplitude of the induced voltage in the piezoelectric balance-spring 16 when the resonator 12 oscillates, and a regulation circuit 20A which receives from the peak voltage detector a signal $S_A$ relating to the amplitude of the induced voltage and which is arranged to manage a power supply voltage $V_A$, supplied to the piezoelectric balance-spring via a phase lock loop 20B, according to a setpoint value $S_C$ for the signal $S_A$ supplied by the peak voltage detector, so as to obtain an oscillation of the resonator with a substantially constant amplitude. The setpoint value $S_C$ corresponds to a setpoint amplitude provided for the oscillation of the resonator 12. The regulation circuit 20A comprises processing parts P, I, D arranged in parallel and well-known to a person skilled in the art, which process a difference between the setpoint value $S_C$ and the value of the amplitude signal $S_A$ by a proportional response, respectively as a function of an integration and a derivation of this difference over time. The regulation circuit also receives a reference voltage $V_R$ which is adjusted according to the regulation performed by the circuit 20A. Finally, to insulate the piezoelectric balance-spring from the peak voltage detector and the regulation circuit and avoid disturbing the electrical power supply thereof, a buffer element 44 (high input impedance transistor) is provided upstream from the peak voltage detector.

In a main alternative embodiment, the phase lock loop 20B slaves the phase of the periodic power supply signal on the phase of the induced voltage signal, supplied particularly to the terminal 71, so that the power supply voltage constrains the piezoelectric balance-spring in the direction of the movement thereof, which is either contracted, or extended according to the current alternation. For example, the circuit 20B detects the passages of the induced voltage through zero, particularly at the terminal 71. Thus, for the pulses to be driving, the polarity of the power supply voltage is selected so as to constrain the piezoelectric balance-spring in the direction of the movement thereof, which is alternately extending and contracted during the alternations of the oscillation of the resonator.

In a specific embodiment, a quartz oscillator is associated with the electronic control circuit 20. This quartz oscillator can be used for various needs. In particular, the management of the power supply voltage $V_A$ can comprise a modulation of the driving pulses with a variable cycle ratio according to the amplitude signal $S_A$ and the setpoint value $S_C$, particularly the difference thereof. In an advantageous alternative embodiment of this specific embodiment, the driving electric pulses are triggered with a setpoint frequency Fc for the oscillator 10/the resonator 12 which is determined very precisely by the quartz oscillator. If the frequency $F_S$ of the power supply signal is not too far removed from the resonance frequency of the resonator, i.e. the natural frequency $F_N$ thereof, such a power supply of the piezoelectric balance-spring can impose the setpoint frequency on the resonator 12 maintained, partially or fully, by the driving electrical pulses, such that the electromechanical oscillator 10 will be able to oscillate at the setpoint frequency, with the precision of the quartz, and an amplitude greater than that corresponding in the first main operating state, and particularly greater than a given limit value, regardless of the spatial orientation of the horological movement. The quartz oscillator, more generally the electronic oscillator is in this system a master oscillator and the electromechanical oscillator is a slave oscillator. The electromechanical oscillator is slaved to the electronic oscillator indirectly, via the generation of the driving electric pulses supplied to the electromagnetic oscillator, the triggering of which is controlled/determined by the electronic oscillator. As a general rule, to be able to impose the setpoint frequency on the electromechanical oscillator via the driving electrical pulses, the latter are supplied at the setpoint frequency Fc, at a harmonic of this setpoint frequency, for example double the setpoint frequency ($F_S=2\cdot Fc$), or at a lower frequency $F_S=2\cdot Fc$ N where N is equal to an integer greater than two (N>2). This number N must be provided small enough, according in particular to the range of possible values for the natural frequency $F_N$ of the electromechanical oscillator and also the quantity of electrical energy to be supplied to this electromechanical oscillator to obtain an increased oscillation amplitude advantageously maintained above a predetermined limit value.

The advantageous alternative embodiment described above can be easily implemented to obtain a gain in precision for the working of the horological movement in the second main operating state, and therefore of the watch incorporating it, virtually without increasing the electrical consumption associated with the partial or total maintenance of a relatively wide amplitude oscillation. It will be noted that, in this advantageous alternative embodiment, the power supply circuit has no need to comprise a phase lock loop for controlling the driving pulses; which simplifies the design thereof. However, in the scenario where the maintenance of the electromechanical oscillator is carried out jointly by the barrel (via the mechanical escapement) and by the electronic control circuit via the electrical pulses applied to the piezoelectric balance-spring, a periodic detection of the phase of the electromechanical oscillator, in particularly of passages through zero of the induced voltage in the piezoelectric balance-spring by a circuit for detecting such passages through zero, can prove to be useful to be able to effectively manage at least one initial operating period, by particularly reducing the duration thereof, before a synchronisation period where the frequency and the phase of the periodic electrical pulses are imposed on the electromagnetic oscillator, such that driving pulses occur substantially at the passages of the resonator via the idle position thereof. As a general rule, in the advantageous alternative embodiment, the electronic control circuit is therefore associated with a quartz oscillator and arranged so as to generate driving electrical pulses with a specific power supply frequency which is determined by the quartz oscillator and which is dependent on a setpoint frequency for the electromagnetic oscillator, which is configured such that the natural oscillation frequency therefore remains within a range of values, for any spatial orientation of the horological movement and any winding level of the barrel, close enough to the setpoint frequency to enable the driving electrical pulses to impose, at least after an initial operating period and in the absence of excessive disturbances, the setpoint frequency Fc on the electromechanical oscillator 10, having a functional oscillation of this electromechanical oscillator at the second amplitude mentioned above, preferably constant.

By combining the advantageous alternative embodiment mentioned above with the preferred embodiment of the electronic control circuit 20 described above, a sort of double regulation of the oscillation frequency of the electromechanical oscillator is obtained in the second main operating state, i.e. a first amplitude regulation which tends to keep the oscillation amplitude constant, regardless of the spatial orientation of the horological movement, thus reducing the variation of the natural frequency of the resonator in concert with the spatial orientation of the horological movement, such that this natural frequency remains close to the setpoint frequency Fc for any possible spatial orientation once an initial setting is performed correctly, and a second regulation obtained by generating driving electrical pulses at a power supply frequency $F_S$ defined above, preferably $F_S=2\cdot Fc/N$ where N is equal to an integer different to zero, or more generally with time intervals between the driving electric pulses of which the value $D_T$ is equal to an integer N multiplied by half the setpoint period Tc (Tc=1/Fc), or a mathematical relation $D_T=N\cdot Tc/2$ where N is greater than zero. The number N, which can be variable, is selected in a range of values making it possible to impose the setpoint frequency Fc on the electromechanical oscillator, this range of values being dependent on the range of possible natural frequencies for this oscillator, which is kept close enough to the setpoint frequency thanks to the first regulation mentioned above.

Thus, as the first amplitude regulation makes it possible to minimise a maximum deviation between the natural frequency $F_N$ of the electromechanical oscillator and the setpoint frequency Fc, regardless of the orientation of the horological movement, the second regulation by a periodic power supply signal determined by the quartz oscillator, in particular by driving electrical pulses at the setpoint frequency Fc, is guaranteed with a relatively large functional amplitude, for all that the number N is not too high. A precision of the working of the horological movement is thus obtained which is equal to that of the quartz oscillator for any spatial orientation of the horological movement and any winding level of the barrel in the second main operating state.

The advantageous alternative embodiment of the specific embodiment may, in another implementation, not be combined with the preferred embodiment of the electronic control circuit, such that the amplitude regulation is not provided and the frequency of the electromechanical oscillator is imposed, at least after an initial operating phase, by the generation of driving electrical pulses at a power supply frequency $F_S$ defined above. In this case, so that the frequency of the driving electrical pulses makes it possible to impose the setpoint frequency Fc on the electromechanical oscillator, these driving electrical pulses are preferably designed so that the frequency thereof corresponds to a small number N, for example N=1 or N=2. Note that an even number N is preferable as the power supply voltage can then retain the same polarity. In a simplified alternative embodiment, the power supply circuit comprises no circuit for detecting the passage of the induced voltage through zero.

The invention claimed is:

1. An horological movement comprising:

an analogue time display, a geartrain, a barrel kinematically linked with the analogue display via the geartrain, an electromechanical oscillator formed of a resonator, comprising a balance and a piezoelectric balance-spring, and a mechanical escapement coupling the balance with the geartrain, the piezoelectric balance-spring being formed at least partially from a piezoelectric material and comprising at least two electrodes of which at least one electrode is connected to an electronic control circuit, the piezoelectric material and said at least one electrode being arranged in such a way as to enable the application, managed by the electronic control circuit, of electrical stress on the piezoelectric balance-spring, and an electrical energy source configured to supply an electrical energy to the electronic control circuit, the horological movement being configured such that, when the electrical energy supplied to the electronic control circuit from the electrical energy source is not sufficient for the electronic control circuit to generate driving electrical pulses for the electromechanical oscillator, the barrel is capable of driving the analogue display and maintaining alone a functional oscillation of the electromechanical oscillator with a first amplitude which is dependent on a position of the horological movement;

wherein the electronic control circuit, when the electrical energy supplied to the electronic control circuit from the electrical energy source is sufficient, is configured to control the application of an electrical voltage to said at least one electrode so as to generate the driving electrical pulses for the electromechanical oscillator which supply it with sufficient energy to enable a functional oscillation of said electromechanical oscillator, for each position of the horological movement, with a second amplitude which is greater than a maximum nominal value of the first amplitude for said position.

2. The horological movement according to claim 1, wherein the electronic control circuit is arranged to control said application of an electrical voltage in such a way as to keep the second amplitude substantially constant for any position of the horological movement and any winding level of the barrel.

3. The horological movement according to claim 2, wherein the electronic control circuit comprises a peak voltage detector, which is arranged to be able to detect substantially the amplitude of the induced voltage in the piezoelectric balance-spring when the resonator oscillates, and a regulation circuit which receives from the peak voltage detector a signal relating to the amplitude of the induced voltage and which is arranged to be able to manage a power supply voltage according to a setpoint value for said signal supplied by the peak voltage detector, so as to obtain an oscillation of the resonator with a substantially constant amplitude.

4. The horological movement according to claim 2, wherein the electronic control circuit is therefore associated with a quartz oscillator comprised in said horological movement, the electronic control circuit being arranged so as to generate said driving electrical pulses with a specific power supply frequency which is determined by the quartz oscillator and dependent on a setpoint frequency for the electromechanical oscillator, which is configured such that the natural oscillation frequency therefore remains within a range of values, for any position of the horological movement and any winding level of the barrel, close enough to the setpoint frequency to enable the driving electrical pulses to impose the setpoint frequency on the electromechanical oscillator while having a functional oscillation at said substantially constant second amplitude.

5. The horological movement according to claim 1, wherein the electronic control circuit is associated with a quartz oscillator comprised in said horological movement, the electronic control circuit being arranged so as to generate said driving electrical pulses with a specific power supply frequency which is determined by the quartz oscillator and dependent on a setpoint frequency for the electromechanical oscillator, which is configured such that the natural oscillation frequency therefore remains within a range of values, for any position of the horological movement and any winding level of the barrel, close enough to the setpoint frequency to enable the driving electrical pulses to impose the setpoint frequency on the electromechanical oscillator while having a functional oscillation at said second amplitude.

6. A watch comprising a horological movement according to claim 1, wherein the electrical energy source is incorporated in said watch and comprises an electricity generator arranged to be able to collect an external energy and convert it into electricity, so as to enable a power supply of the electronic control circuit and the piezoelectric balance-spring.

* * * * *